United States Patent
Ker et al.

(10) Patent No.: US 10,577,995 B2
(45) Date of Patent: Mar. 3, 2020

(54) DOUBLE WALL MIXER WITH ACTIVE HEAT TRANSFER

(71) Applicant: Faurecia Emissions Control Technologies, USA, LLC, Columbus, IN (US)

(72) Inventors: Eric Ker, Columbus, IN (US); John G. Rohde, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 159 days.

(21) Appl. No.: 15/686,220

(22) Filed: Aug. 25, 2017

(65) Prior Publication Data

US 2019/0063291 A1 Feb. 28, 2019

(51) Int. Cl.
*F01N 3/26* (2006.01)
*F01N 3/20* (2006.01)
(Continued)

(52) U.S. Cl.
CPC ............ *F01N 3/26* (2013.01); *B01F 3/04049* (2013.01); *B01F 5/0473* (2013.01); *B01F 5/0614* (2013.01); *F01N 3/021* (2013.01); *F01N 3/206* (2013.01); *F01N 3/2013* (2013.01); *F01N 3/2066* (2013.01); *F01N 3/2892* (2013.01); *F01N 13/009* (2014.06); *F01N 2240/16* (2013.01); *F01N 2240/20* (2013.01);
(Continued)

(58) Field of Classification Search
CPC ...... F01N 3/2013; F01N 3/206; F01N 3/2066; F01N 2240/16; F01N 2610/02; F01N 2900/1811

USPC .......................................................... 60/324
See application file for complete search history.

(56) References Cited

U.S. PATENT DOCUMENTS 7,509,799 B2 * 3/2009 Amou ................ B01D 53/9431
60/286
8,966,884 B2 3/2015 Kruse et al.
(Continued)

FOREIGN PATENT DOCUMENTS

JP     H04365303     12/1992
JP     2005214175     8/2005
(Continued)

OTHER PUBLICATIONS

Ohmite Thick Film Heaters, EEWeb, Apr. 5, 2016 (Year: 2016).*
Flexible Heaters, International Heating Products, archived as early as Apr. 4, 2016 (Year: 2016).*

*Primary Examiner* — Audrey K Bradley
(74) *Attorney, Agent, or Firm* — Carlson, Gaskey & Olds, P.C.

(57) ABSTRACT

A vehicle exhaust system includes an outer housing defining an internal cavity surrounding an axis, an inlet baffle configured to direct engine exhaust gas into the internal cavity, an injector that is configured to spray a fluid into the internal cavity to mix with engine exhaust gas, and an inner wall spaced radially inward of an inner surface of the outer housing to define a gap. The inner wall has an impingement side facing the axis and a non-impingement side facing the gap. At least one heating element is associated with the non-impingement side to actively heat the inner wall to reduce spray deposit formation on the impingement side.

24 Claims, 4 Drawing Sheets

(51) Int. Cl.
  *F01N 13/00* (2010.01)
  *B01F 5/06* (2006.01)
  *F01N 3/28* (2006.01)
  *B01F 5/04* (2006.01)
  *B01F 3/04* (2006.01)
  *F01N 3/021* (2006.01)

(52) U.S. Cl.
  CPC .... *F01N 2610/02* (2013.01); *F01N 2610/102* (2013.01); *F01N 2900/1811* (2013.01)

(56) References Cited

U.S. PATENT DOCUMENTS

| | | |
|---|---|---|
| 9,062,582 B2 | 6/2015 | Loman et al. |
| 9,464,558 B2 * | 10/2016 | Többen ................ F01N 3/0253 |
| 2010/0050603 A1 * | 3/2010 | Seino .................... F01N 3/2066 60/282 |
| 2011/0131958 A1 | 6/2011 | Adelman et al. |
| 2015/0152766 A1 | 6/2015 | Brunel |
| 2018/0135487 A1 * | 5/2018 | Vempati ................ F01N 3/2892 |

FOREIGN PATENT DOCUMENTS

| | | |
|---|---|---|
| JP | 2006017043 | 1/2006 |
| WO | 2014098728 | 6/2014 |

\* cited by examiner

DOUBLE WALL MIXER WITH ACTIVE HEAT TRANSFER

BACKGROUND OF THE INVENTION

An exhaust system conducts hot exhaust gases generated by an engine through various exhaust components to reduce emissions and control noise. The exhaust system includes an injection system that injects a fluid such as a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. Potential adverse effects may include: a lower ammonia uniformity index, an increased pressure drop across the mixer, or higher ammonia emissions during active diesel particulate filter (DPF) regeneration.

SUMMARY OF THE INVENTION

In one exemplary embodiment, a vehicle exhaust system includes an outer housing defining an internal cavity surrounding an axis, an inlet baffle configured to direct engine exhaust gas into the internal cavity, an injector that is configured to spray a fluid into the internal cavity to mix with engine exhaust gas, and an inner wall spaced radially inward of an inner surface of the outer housing to define a gap. The inner wall has an impingement side facing the axis and a non-impingement side facing the gap. At least one heating element is associated with the non-impingement side to actively heat the inner wall to reduce spray deposit formation on the impingement side.

In a further embodiment of the above, the at least one heating element comprises a thick film heater.

In a further embodiment of any of the above, the thick film heater comprises a positive temperature coefficient resister heater.

In a further embodiment of any of the above, the at least one heating element comprises a ceramic heater.

In another exemplary embodiment, a method of reducing spray deposit formation in a mixer of a vehicle exhaust system comprises providing an outer housing and inner wall as described and using at least one heating element associated with the non-impingement side of the inner wall to actively heat the inner wall to reduce spray deposit formation on the impingement side.

In a further embodiment of any of the above, a thick film heater is applied along the non-impingement side of the inner wall to provide the heating element.

In a further embodiment of any of the above, the thick film heater is pasted to the non-impingement side of the inner wall.

In a further embodiment of any of the above, the thick film heater is printed on the non-impingement side of the inner wall.

In a further embodiment of any of the above, a radially outer exhaust gas passage is formed in the gap between the outer housing and the inner wall and a radially inner exhaust gas passage is defined by the impingement side of the inner wall, and the heating element is positioned within the radially outer exhaust gas passage and is attached to the non-impingement side of the inner wall.

In a further embodiment of any of the above, the inlet baffle has at least one first opening to direct engine exhaust gas into the radially inner exhaust gas passage and at least one second opening to direct engine exhaust gas into the radially outer exhaust gas passage.

In a further embodiment of any of the above, the thick film heater comprises an electric heater positioned within the gap and a power source is attached to the electric heater with at least one electrical connection such that the power source applies a first power level when a temperature of the inner wall is below a predetermined temperature and applies a second power level that is less than the first power level when the temperature of the inner wall is above the predetermined temperature.

In a further embodiment of any of the above, at least one shield is provided to protect a connection interface of the electrical connection to the electric heater.

These and other features of this application will be best understood from the following specification and drawings, the following of which is a brief description.

DETAILED DESCRIPTION

Figure 1:
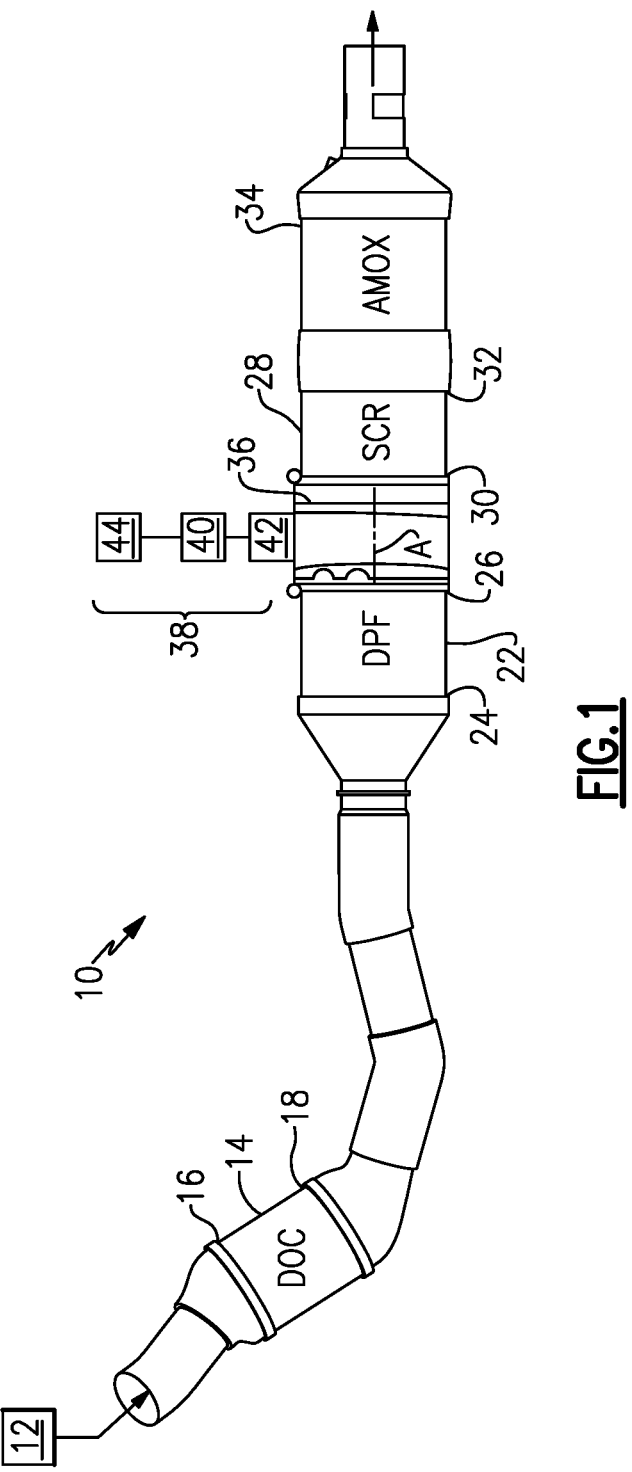
FIG. 1 illustrates one example of an exhaust system with a mixer according to the subject invention.

FIG. 1 shows a vehicle exhaust system 10 that conducts hot exhaust gases generated by an engine 12 through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known.

In one example configuration shown in FIG. 1, the exhaust components direct engine exhaust gases into a diesel oxidation catalyst (DOC) 14 having an inlet 16 and an outlet 18. Downstream of the DOC 14 there may be a diesel particulate filter (DPF) 22 that is used to remove contaminants from the exhaust gas as known. The DPF has an inlet 24 and an outlet 26. Downstream of the DOC 14 and optional DPF 22 is a selective catalytic reduction (SCR) catalyst 28 having an inlet 30 and an outlet 32. The outlet 32 communicates exhaust gases to downstream exhaust components 34. Optionally, component 28 can comprise a catalyst that is configured to perform a selective catalytic reduction function and a particulate filter function. The various downstream exhaust components 34 can include one or more of the following: pipes, additional filters, valves, additional catalysts, mufflers, etc. These exhaust components can be mounted in various different configurations and combinations dependent upon vehicle application and available packaging space.

A mixer 36 is positioned upstream of the inlet 30 of the SCR catalyst 28 and downstream from the outlet 18 of the DOC 14, or the outlet 26 of the DPF 22. The upstream catalyst and downstream catalyst can be arranged to be in-line, parallel, or angled relative to each other. The mixer 36 is used to generate a swirling or rotary motion of the exhaust gas. This mixer 36 and the motion of the exhaust gas will be discussed in greater detail below.

An injection system 38 is used to inject a fluid such as DEF or a reducing agent, such as a solution of urea and water for example, into the exhaust gas stream upstream from the SCR catalyst 28 such that the mixer 36 can mix the fluid and exhaust gas thoroughly together. The injection system 38 includes a fluid supply 40, a doser or injector 42, and a controller 44 that controls injection of the fluid as known.

Figure 2A:
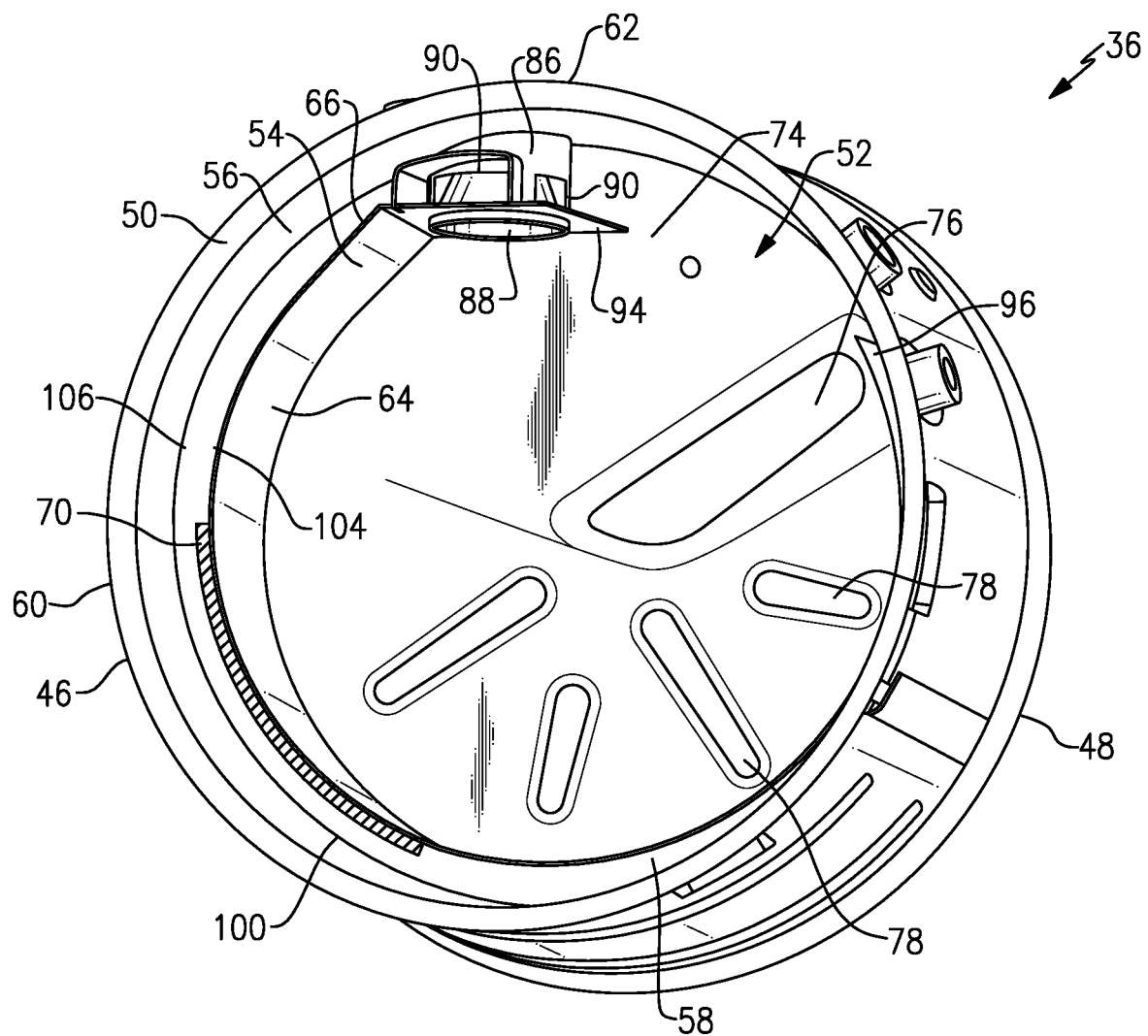
FIG. 2A is a perspective view of one example of a mixer with an active heating element configured to heat an inner wall.
Figure 2B:
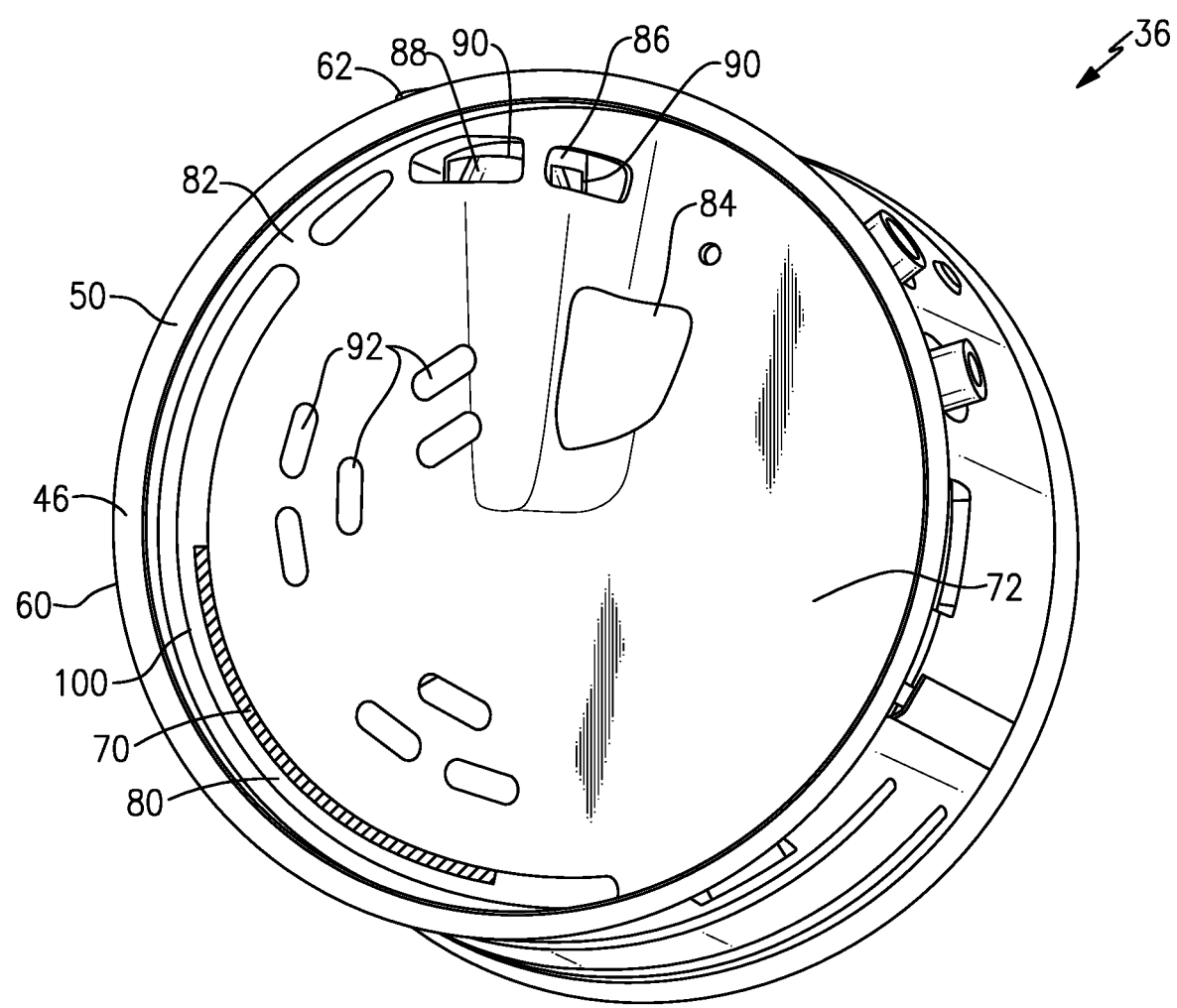
FIG. 2B is a view similar to FIG. 2A but showing an inlet baffle installed in the mixer.

One example of a mixer 36 is shown in FIGS. 2A-2B. The mixer 36 defines a mixer center axis A (FIG. 1) and has an inlet end 46 configured to receive the engine exhaust gases from the outlet 26 of the DPF 22 or the outlet 18 of the DOC 14 as shown in FIG. 1. The mixer 36 has an outlet end 48 to direct a mixture of swirling engine exhaust gas and products transformed from the injected fluid to the inlet 30 to the SCR catalyst 28. The mixer 36 includes an outer housing 50 defining an internal cavity 52 surrounding the axis A. An inner wall 54 is spaced radially inward of an inner surface 56 of the outer housing 50 to define a gap 58. The outer housing 50 also includes an outer surface 60 that forms an exterior/outermost surface of the mixer 36. The injector 42, which is configured to spray the fluid into the internal cavity 52 to mix with the engine exhaust gas, is mounted to the outer housing 50 at a mount area 62.

The inner wall 54 has an impingement side 64 facing the axis A and a non-impingement side 66 facing the gap 58. When the injector 42 sprays the fluid into the internal cavity 52 to mix with swirling exhaust gas, the mixture is directed in part toward the impingement side 64 of the inner wall 54 which comprises an impact zone. As the temperature of the spray is less than the temperature of the exhaust gas, the spray can have a cooling effect on the inner wall 54 at the impact zone such that deposits from the spray may start to form on the impingement side 64 of the inner wall 54.

In order to reduce the possibility of deposit formation, the mixer 36 includes at least one active heating element 70 that is positioned within the gap 58, and which is in contact with the non-impingement side 64 of the inner wall 54. The active heating element 70 is configured to heat the inner wall 54 such that the possibility of spray deposit formation on the impingement side 64 is significantly reduced.

An inlet baffle 72 (FIG. 2B) is mounted to the inlet end 46 of the mixer 36 and is configured to direct engine exhaust gas into the internal cavity 52. The mixer 36 also includes an outlet baffle 74 (FIG. 2A) through which a mixture of spray and exhaust gas exits the outlet end 48 of the mixer 36. In the example shown in FIG. 2A, the outlet baffle 74 comprises a plate that includes a primary opening 76 through which a majority of a mixture of engine exhaust gas and spray exits the internal cavity 52 and a plurality of secondary openings 78 that are smaller than the primary opening 76. The secondary openings 78 help reduce back pressure and can be configured to have different shapes, sizes, and/or patterns in various combinations.

The inlet baffle 72 comprises a plate that includes at least one first inlet opening 80 that extends along a peripheral edge 82 of the inlet baffle 72. The first inlet opening 80 may at least partially overlaps the active heating element 70 and comprises an exhaust gas inlet to direct hot engine exhaust gas into the gap 58. This exhaust gas also helps to heat the inner wall 54; however, when the vehicle engine is first started, or when operating at low torque/low exhaust temperature cycles, the internal exhaust components may not be at high enough temperatures to discourage deposit formation. The active heating element 70 can be immediately activated to heat the inner wall 54 to quickly raise the temperature to a high enough temperature, such as to above 250 deg C. during operation for example, to prevent deposit formation.

In one example, the active heating element 70 extends in a peripheral direction about the axis A, and the inlet opening 80 extends along the peripheral edge 82 of the inlet baffle 72 and overlaps an entire peripheral length of the inner wall portion that includes the active heating element 70. Additionally or alternatively, the inlet opening 80 could be a series of openings or only overlap a portion of the inner wall that includes the active heating element 70. In another example, the inlet opening could be at a location that does not overlap the inner wall portion.

The inlet baffle 72 also includes one or more second inlet openings 84 positioned adjacent to the injector 42 and injector mount area 62 to direct the engine exhaust gas toward spray entering the internal cavity 52. In the example shown, the second inlet opening 84 comprises the primary opening that is longer in size than other openings in the inlet baffle. However, the second inlet opening 84 could also be formed as a series of openings.

In one example, the mixer includes an inlet housing 86 that at least partially surrounds an inlet cone 88 that extends inwardly from the inner surface of the outer housing 50 as shown in FIG. 2A. The injector 42 (FIG. 1) is mounted to the mount area 62 such that fluid spray enters an inlet end of the inlet cone 88 and then diverges outwardly to exit an outlet end of the cone 88. The inlet housing 86 includes openings 90 that help direct exhaust gas toward the inlet end of the cone 88 to mix with the fluid spray.

The inlet baffle 72 also includes one or more third inlet openings 92 that are smaller than the first 80 and second 84 inlet openings. The third inlet openings 92 are positioned on the inlet baffle 72 to reduce back pressure. The third inlet openings 92 are typically smaller than the second inlet opening 84. The third inlet openings 92 can be configured to have different shapes, sizes, and/or patterns in various combinations.

Note that the plates shown in the disclosed examples for the inlet 72 and outlet 74 baffles are just one example. It should be understood that the plates could be flat or have a contoured or helical plate configuration. Additionally or alternatively, the number and configuration of the various inlet and outlet openings can be varied dependent upon different applications.

Figure 3:
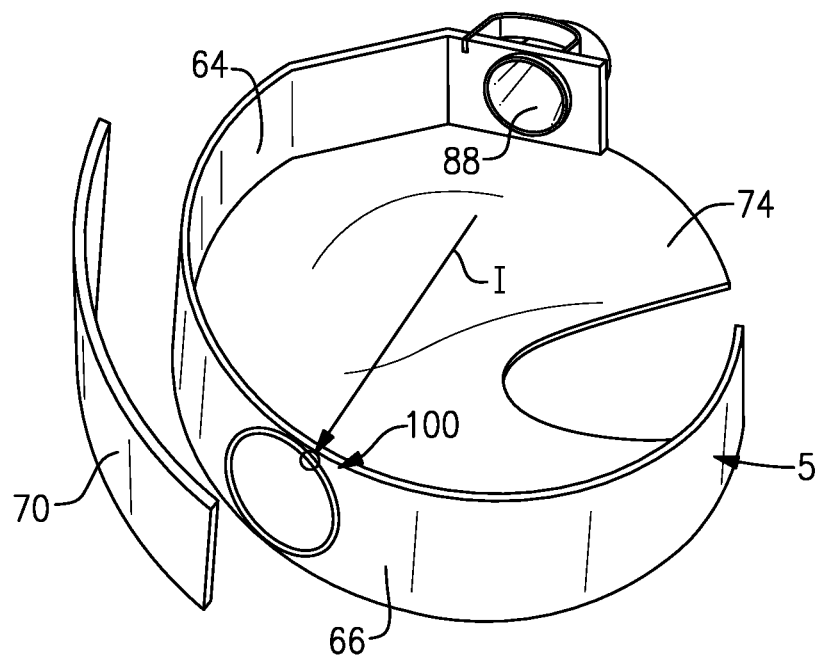
FIG. 3 is a perspective view of the outlet baffle, inner wall, and active heat element.

The inner wall 54 and outlet baffle 74 are shown in FIG. 3. The spray is injected along an injection axis I. Due to the injection velocity of the spray, an area on the impingement side 64 of the inner wall 54 that is facing the outlet end of the cone 88 comprises an impact zone 100. This impact zone 100 comprises an area where deposit formation can occur. The active heating element 70 is mounted directly to the non-impingement side 66 of the inner wall 54 and is used to actively heat this impact zone 100 to reduce the likelihood of deposit formation.

Figure 4:
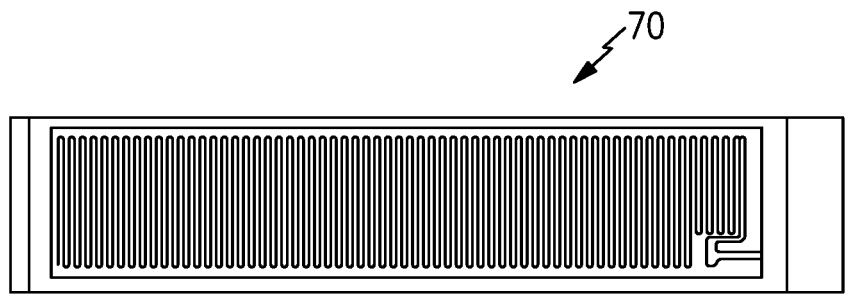
FIG. 4 shows one example of an active heating element.
Figure 5:
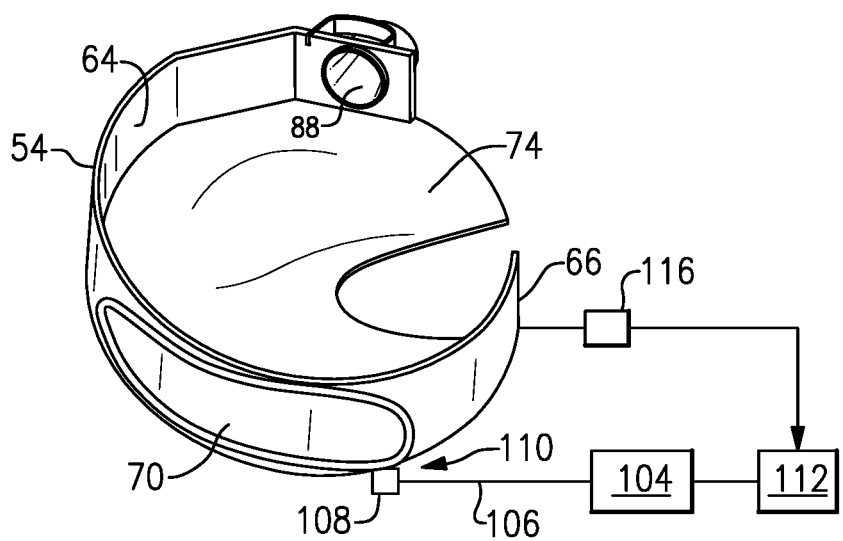
FIG. 5 is similar to FIG. 3 but showing the active heating element attached to the inner wall.

In one example, the active heating element 70 comprises a ceramic and/or an electric heater 102. In one example shown in FIG. 4, the active heating element 70 comprises a thick film heater such as a positive temperature coefficient (PTC) resister heater that is applied along the non-impingement side 66 of the inner wall 54 as shown in FIG. 5. The PTC resistive heater can be pasted or printed, for example, directly to the non-impingement side 66 of the inner wall 54.

In one example, the active heating element 70 is coupled to a power supply 104 with at least one electrical connection 106. The electrical connection 106 can be attached via welding or brazing, for example. The assembly also includes at least one shield 108 to protect and stabilize a connection interface 110 of the electrical connection 106 to the active heating element 70. Any type of shield 108 such as a plate, cap, coating, etc. can be applied at the connection interface 110.

The power supply 104 can be a 12 V, 24 V, or more preferably a 48 V power supply that is associated with a vehicle power supply system. Optionally, the power supply 104 could be a dedicated power supply used only for the exhaust system component. In one example, a controller 112 actively controls the power source 104 to provide a first power level when a temperature of the inner wall 54 is below a predetermined temperature and a second power level that is less than the first power level when the temperature of the inner wall 54 is above the predetermined temperature. The controller 112 can be part of a vehicle or engine electronic control unit, or can be a dedicated electronic control unit programmed to control the power supply 104 and active heating element 70.

A temperature sensor 116 may be used to measure the temperature of the wall 54 and communicate the temperature to the controller 112. As such, the active heating element power requirement is reduced as temperatures increase as the exhaust system components heat up during vehicle operation over time. Once the inner wall temperature reaches a peak or predetermined temperature level, a lower power level from the power supply 104 is required to maintain the temperature at a desired level.

In one example, the inner wall 54 is comprised of sheet metal and the active heating element 70 is applied to one or more predetermined areas on the non-impingement side 66 to directly heat the sheet metal in these specified areas. The location of these areas can be tailored based on the type, size, and injector mount orientation for different types of mixers.

In one example, the active heating element 70 is mounted to extend along the non-impingement side 66 of the inner wall 54 only partially about the axis A. This is best shown in FIG. 5 where the active heating element 70 is mounted to cover only a portion of the inner wall 54. In one example, the active heating element 70 is mounted to the non-impingement side 66 of the inner wall 54 at a location that is directly opposite from impingement side 64 that includes the impact zone 100. As discussed above, the outer housing 50 extends circumferentially and completely around the axis A which is at a center of the outer housing 50. The inner wall 54 extends only partially about the axis A. In other words, the inner wall 54 does not completely surround the axis A. In the example shown in FIG. 2A, the inner wall 54 has a first end 94 that is supported at least in part by the inlet housing 86 and extends circumferentially to a second end 96 that is circumferentially spaced apart from the first end 94 by a gap.

The area between the outer housing 50 and the inner wall 54 forms a radially outer exhaust gas passage while the area radially inward for the inner wall 54 comprises a radially inner exhaust gas passage. The inlet opening 80 directs exhaust gas into the radially outer exhaust gas passage and the remaining inlet openings 84, 92 direct exhaust gas into the radially inner exhaust gas passage. In one example, the active heating element 70 extends a first circumferential length and the inner wall 54 extends a second circumferential length that is greater than the first circumferential length. The circumferential length of the active heating element 70 can be varied as needed to heat the inner wall 54 at impact zone areas.

The subject invention uses an actively controlled heating element 70 to heat the inner wall 54 to prevent/reduce deposit formation on the impingement side 66 of the inner wall 54. This heating of the inner wall 54 also results in reduced crystallization, which improves urea performance and reduces back pressure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
an outer housing defining an internal cavity surrounding an axis;
an inlet baffle configured to direct engine exhaust gas into the internal cavity;
an injector that is configured to spray a fluid into the internal cavity downstream of the inlet baffle to mix with engine exhaust gas;
an inner wall spaced radially inward of an inner surface of the outer housing to define a gap, wherein the inner wall has an impingement side facing the axis and a non-impingement side facing the gap;
at least one opening formed in the inlet baffle to direct exhaust gas flow into the gap; and
at least one heating element associated with the non-impingement side to actively heat the inner wall to reduce spray deposit formation on the impingement side.

2. The vehicle exhaust system according to claim 1 wherein the outer housing comprises a curved housing and wherein the inner wall comprises a curved wall portion that is spaced radially inward of the inner surface of the outer housing such that a radially outer exhaust gas passage is formed in the gap between the outer housing and the inner wall and a radially inner exhaust gas passage is defined at least in part by the impingement side of the inner wall, and wherein the at least one heating element comprises an electric heater that is positioned within the radially outer exhaust gas passage and is attached to the non-impingement side of the curved wall portion.

3. The vehicle exhaust system according to claim 1 wherein the at least one heating element comprises a ceramic heater.

4. The vehicle exhaust system according to claim 1 including an outlet baffle positioned downstream of the inlet baffle, and wherein the fluid is injected into the internal cavity between the inlet and the outlet baffles.

5. The vehicle exhaust system according to claim 1 wherein the at least one heating element comprises a thick film heater.

6. The vehicle exhaust system according to claim 5 wherein the thick film heater comprises a positive temperature coefficient resister heater.

7. The vehicle exhaust system according to claim 6 including a power source coupled to the positive temperature coefficient resister heater, and wherein the power source provides a first power level when the inner wall is below a predetermined temperature and a second power level that is less than the first power level when the inner wall is above the predetermined temperature.

8. The vehicle exhaust system according to claim 1 wherein the at least one heating element comprises an electric heater positioned within the gap and including a power source attached to the electric heater with at least one electrical connection.

9. The vehicle exhaust system according to claim 8 including at least one shield to protect a connection interface of the electrical connection to the electric heater.

10. The vehicle exhaust system according to claim 8 wherein the inner wall is comprised of a metal material and wherein the power source provides a first power level when a temperature of the metal material is below a predetermined temperature and a second power level that is less than the first power level when the metal material is above the predetermined temperature.

11. A vehicle exhaust system comprising:
an outer housing defining an internal cavity surrounding an axis;
an inlet baffle configured to direct engine exhaust gas into the internal cavity;
an injector that is configured to spray a fluid into the internal cavity downstream of the inlet baffle to mix with engine exhaust gas;
an inner wall spaced radially inward of an inner surface of the outer housing to define a gap, wherein the inner wall has an impingement side facing the axis and a non-impingement side facing the gap; and
at least one heating element associated with the non-impingement side to actively heat the inner wall to reduce spray deposit formation on the impingement side, wherein the at least one heating element is a thick film heater that comprises a positive temperature coefficient resister heater, and wherein the positive temperature coefficient resister heater is applied along a predetermined length of the non-impingement side of the inner wall, and wherein the predetermined length is positioned opposite the injector.

12. A vehicle exhaust system comprising:
an outer housing defining an internal cavity surrounding an axis;
an inlet baffle configured to direct engine exhaust gas into the internal cavity;
an injector that is configured to spray a fluid into the internal cavity to mix with engine exhaust gas;
an inner wall spaced radially inward of an inner surface of the outer housing to define a gap, wherein the inner wall has an impingement side facing the axis and a non-impingement side facing the gap;
the outer housing comprises a curved housing and the inner wall comprises a curved wall portion that is spaced radially inward of the inner surface of the outer housing such that a radially outer exhaust gas passage is formed in the gap between the outer housing and the inner wall and a radially inner exhaust gas passage is defined at least in part by the impingement side of the inner wall;
wherein the inlet baffle includes at least one opening into the radially inner exhaust gas passage and at least one opening into the radially outer exhaust gas passage; and
at least one heating element associated with the non-impingement side to actively heat the inner wall to reduce spray deposit formation on the impingement side, wherein the at least one heating element comprises an electric heater that is positioned within the radially outer exhaust gas passage and is attached to the non-impingement side of the curved wall portion.

13. A vehicle exhaust system comprising:
an outer housing defining an internal cavity surrounding an axis;
an inlet baffle configured to direct engine exhaust gas into the internal cavity;
an injector that is configured to spray a fluid into the internal cavity downstream of the inlet baffle to mix with engine exhaust gas;
an inner wall spaced radially inward of an inner surface of the outer housing to define a gap, wherein the inner wall has an impingement side facing the axis and a non-impingement side facing the gap, wherein the inner wall extends only partially about the axis; and
at least one heating element associated with the non-impingement side to actively heat the inner wall to reduce spray deposit formation on the impingement side.

14. A method of reducing spray deposit formation in a mixer of a vehicle exhaust system comprising:
providing an outer housing defining an internal cavity surrounding an axis;
positioning an inlet baffle relative to the outer housing to direct engine exhaust gas into the internal cavity;
mounting an injector to the outer housing such that the injector injects a fluid into the internal cavity downstream of the inlet baffle to mix with engine exhaust gas;
spacing an inner wall radially inward of an inner surface of the outer housing to define a gap, wherein the inner wall has an impingement side facing the axis and a non-impingement side facing the gap;
forming at least one opening in the inlet baffle to direct exhaust gas flow into the gap; and
associating at least one heating element with the non-impingement side to actively heat the inner wall to reduce spray deposit formation on the impingement side.

15. The method according to claim 14 including positioning an outlet baffle downstream of the inlet baffle and injecting the fluid into the internal cavity between the inlet and the outlet baffles.

16. The method according to claim 14 wherein the inner wall extends only partially about the axis.

17. The method according to claim 14 including applying a thick film heater along the non-impingement side of the inner wall to provide the heating element.

18. The method according to claim 17 wherein the thick film heater comprises a positive temperature coefficient resister heater.

19. The method according to claim 17 including pasting the thick film heater to the non-impingement side of the inner wall.

20. The method according to claim 17 including printing the thick film heater on the non-impingement side of the inner wall.

21. The method according to claim 17 including forming a radially outer exhaust gas passage in the gap between the outer housing and the inner wall and defining a radially inner exhaust gas passage by the impingement side of the inner wall, positioning the heating element within the radially outer exhaust gas passage, and attaching the heating element to the non-impingement side of the inner wall.

22. The method according to claim 17 wherein the thick film heater comprises a electric heater positioned within the gap and including attaching a power source to the electric heater with at least one electrical connection such that the power source applies a first power level when a temperature of the inner wall is below a predetermined temperature and applies a second power level that is less than the first power level when the temperature of the inner wall is above the predetermined temperature.

23. The method according to claim 22 including providing at least one shield to protect a connection interface of the electrical connection to the electric heater.

24. A method of reducing spray deposit formation in a mixer of a vehicle exhaust system comprising:

providing an outer housing defining an internal cavity surrounding an axis;

positioning an inlet baffle relative to the outer housing to direct engine exhaust gas into the internal cavity;

mounting an injector to the outer housing such that the injector injects a fluid into the internal cavity to mix with engine exhaust gas;

spacing an inner wall radially inward of an inner surface of the outer housing to define a gap, wherein the inner wall has an impingement side facing the axis and a non-impingement side facing the gap;

forming a radially outer exhaust gas passage in the gap between the outer housing and the inner wall and defining a radially inner exhaust gas passage by the impingement side of the inner wall;

associating at least one heating element with the non-impingement side to actively heat the inner wall to reduce spray deposit formation on the impingement side, and including positioning the heating element within the radially outer exhaust gas passage and attaching the heating element to the non-impingement side of the inner wall;

applying a thick film heater along the non-impingement side of the inner wall to provide the heating element; and providing the inlet baffle with at least one first opening to direct engine exhaust gas into the radially inner exhaust gas passage and at least one second opening to direct engine exhaust gas into the radially outer exhaust gas passage.

* * * * *